United States Patent [19]

Budworth et al.

[11] Patent Number: 4,760,574
[45] Date of Patent: Jul. 26, 1988

[54] PHOTOGRAPHIC ORDER MATCHING METHOD AND APPARATUS

[75] Inventors: Janice I. Budworth, Bellevue; Donald F. Knull, Seattle; Maxwell G. Maginness, Redmond, all of Wash.

[73] Assignee: CX Corporation, Seattle, Wash.

[21] Appl. No.: 888,355

[22] Filed: Jul. 23, 1986

[51] Int. Cl.[4] .......................... G03B 27/32; G06K 7/08
[52] U.S. Cl. ............................................. 371/5; 101/2; 235/437; 355/40
[58] Field of Search ..................... 371/5; 235/437, 438; 101/2; 355/40, 41, 112

[56] References Cited

U.S. PATENT DOCUMENTS

| | | | |
|---|---|---|---|
| 4,044,227 | 8/1977 | Holm et al. | 235/437 |
| 4,053,751 | 10/1977 | Ault | 371/5 X |
| 4,056,710 | 11/1977 | Shepardson et al. | 235/437 |
| 4,073,588 | 2/1978 | Zangenfeind et al. | 355/41 |
| 4,160,901 | 7/1979 | Nakanishi et al. | 235/437 |
| 4,239,151 | 12/1980 | Enser et al. | 235/437 |
| 4,363,123 | 12/1982 | Grover | 371/5 |
| 4,566,101 | 1/1986 | Skonieczny et al. | 371/5 |
| 4,574,692 | 3/1986 | Wahli | 101/2 |
| 4,640,612 | 2/1987 | Watanabe et al. | 355/87 |

*Primary Examiner*—Charles E. Atkinson
*Attorney, Agent, or Firm*—Christensen, O'Connor, Johnson & Kindness

[57] ABSTRACT

A method and apparatus for maintaining correlation between the parts of a film processing order from its receipt in a lab to its assembly for return to the customer includes placing a machine-readable identifier on the film, envelope and prints. The identifiers are read at the point of final order assembly and if any identifiers are not readable an error counter is incremented. If the error counter reaches a predetermined maximum number, an alarm is given and the operation is halted for operator intervention. If the maximum error number is not reached, the identifiers read at the finishing station are compared for equality. If there is a mismatch between identifiers, an alarm is given and the operation halted for operator intervention. Each time an order is successfully processed with no misreads, the error counter is decremented by some predetermined number. In a predetermined embodiment, the error counter is reset after each operation intervention.

8 Claims, 4 Drawing Sheets

PHOTOGRAPHIC ORDER MATCHING METHOD AND APPARATUS

BACKGROUND OF THE INVENTION

This invention relates to a method and apparatus for matching the elements of a photographic order after the order has been processed and the items separated in order to accomplish such processing. More specifically, the invention relates to a method of monitoring and evaluating matching errors to maintain a steady flow of orders without unnecessary shutdowns due to perceived errors in the matching process.

In a typical commercial photographic operation for the processing of photographic film received from amateur photographers, the orders are accumulated at pickup points such as drugstores, supermarkets, or photographic equipment stores and then shipped to a central processing location where the undeveloped films are developed and prints made from the developed negatives. Typically, the undeveloped film is delivered to the processing lab in an envelope which contains information as to the identity of the customer. The film must be separated from the envelope during the developing process and after the film has been processed it is necessary to match the developed film along with prints made from the film with the envelope in order to return the finished order to the proper customer.

The orders are usually processed in batches and even though the film and the envelopes are separated during the processing operation they are maintained in their original batch sequence so that at the end of the process the serial nature of the processing is usually sufficient to maintain correlation between the film, the envelopes, and the prints. Since it is a major customer relations problem if any number of films are mismatched and returned to the wrong customer or the wrong prints are mistakenly returned to the customer, processing labs are very much concerned with keeping a constant watch on the orders to insure that the matching is correct. Prior to the use of automated machinery and machine-readable coding on the various parts of the order, the matching was done by visual inspection by workers in the processing plant. In order to increase the speed with which the orders were processed it was determined that it was not necessary to check every single order since the serial nature of the processing typically took care of the matching process and therefore only periodic checks of every five or ten orders were made to insure that the match was correct with the idea being that if every fifth or tenth order was correctly matched that the intervening unchecked orders would also have been correctly matched.

With the advent of machine-readable codes that can be placed on the envelope, film, and prints and automated machinery to read those codes and compare them to one another, it has become possible to check every order as it goes through the processing steps and to check the match of every order prior to its shipment back to the customer. Currently, if there is a problem in reading any of the codes this shows up as an error in the match and the entire assembly line is shut down until the error is corrected. Usually these non-reads, when they are checked manually, are found to be correct matches and it is not a question of the codes on the various items not matching but just a factor of a misread or nonread of one or more of the codes on the various items due to initial faulty printing of the code, damage during handling or a faulty reader. Shutting down and restarting the assembly line takes valuable time which detracts from the production output rate of the lab, severely affecting profitability of the lab and causing customer dissatisfaction due to late delivery of orders. It is therefore an object of the present invention to provide a method and apparatus for increasing the production rate of items passing through a photofinishing lab by conducting an error analysis of potential mismatches due to misreads or nonreads of identification codes present on the photographic film or customer envelope. It is a further object of this invention to provide a method for conducting the error analysis in such a manner as to give weight to a detected error based on previous history of detected errors according to a predetermined scheme.

SUMMARY OF THE INVENTION

In accordance with the foregoing objects the invention contemplates an apparatus in which corresponding identifying codes are provided on an order envelope and undeveloped film prior to processing of the film. Means are also included to provide the same identifying code on prints made from the film after development. Reading means are provided to read the identifying code from each of the three elements of the photofinishing order. A comparison means is provided which receives as its input the signals representative of the codes read from the three parts of the order and which provides as its output an alarm signal if any one of the codes does not match the others and which provides an error signal if any one of the codes cannot read.

In accordance with the error analysis method, each item to be matched is assigned a particular identifying code. After the items have gone through whatever processing is necessary the identifying code is read from each of the items, a check is made to see that the code has been read, and if not an error signal is generated. The error signal increments an error counter and the error counter contents is compared with a predetermined maximum error number. If the number in the error counter matches the predetermined number, an alarm signal is generated and the processing operation is stopped until corrective action can be taken by doing a manual check of the parts of the order to make sure that they do match and possibly taking steps to repair any faulty equipment that may be causing the nonread situation.

If the number in the error counter does not equal or exceed the predetermined maximum number of errors allowed, the order processing continues and the identification codes read from the parts of the order that can be read are compared to see if they match. If there is a mismatch between any two codes, then an alarm again is set and the processing is shut down until corrective action can be taken. If all the numbers match, then processing continues with reading of the identifying codes from the next set of order components.

Preferably, the error analysis is designed so that upon a successful order match the error counter is decremented by some predetermined amount in order to take into account the successful completion of a cycle. In this way, the history of good matches will be used to weight the effects of a single non-read in the future. The maximum error number, which must be reached prior to a shutdown of the processing line, and the weight to be given a good read, in the sense of the amount by which the error counter is decremented upon each successful read operation, are determined either empirically by operating the system and determining the limits that can be tolerated or statistically based on the probability that the order matching will continue correctly without any operator intervention.

While the invention herein is described in terms of a photographic finishing environment it should be noted that the error analysis methods disclosed herein can be used in any production operation in which it is necessary to maintain a check on the operation of a production line in which the probability is that production will continue correctly but in which the consequences of a fault are too great to leave to chance that the operation will continue to be correct; thus, making it necessary to continuously monitor the production operation. Error conditions are then weighted according to their severity of consequence to determine whether a particular error will simply be noted or whether the error is sufficient to cause a shutdown of the production operation.

BRIEF DESCRIPTION OF THE DRAWINGS

The invention described herein will be better understood by those of ordinary skill in the art and others upon reading the following specification taken in conjunction with the appended drawings wherein.

DETAILED DESCRIPTION OF THE PREFERRED EMBODIMENT

Figure 1:
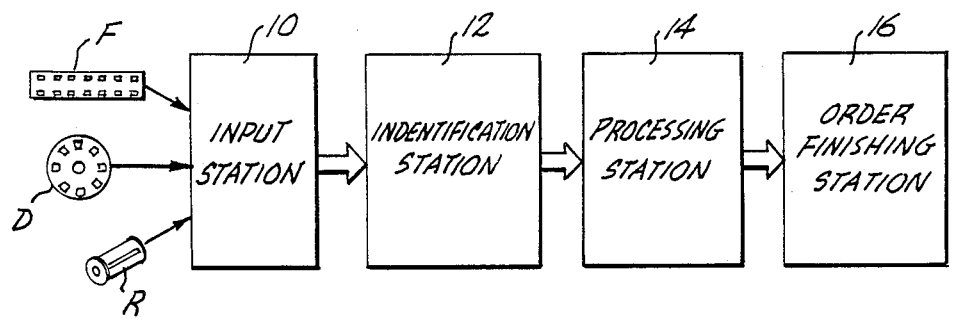
FIG. 1 is a blocked diagram of a photofinishing process.
Figure 5:
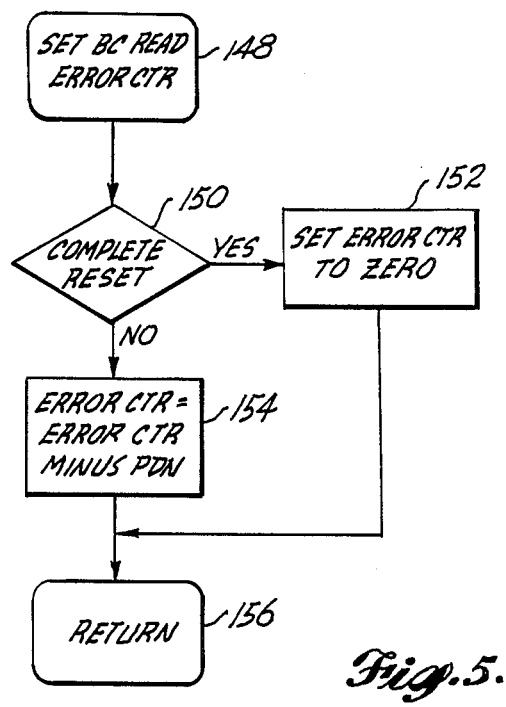
FIGS. 2 through 5 comprise a flow chart of the identification checking and error analysis method according to the principals of the present invention.
Figure 2:
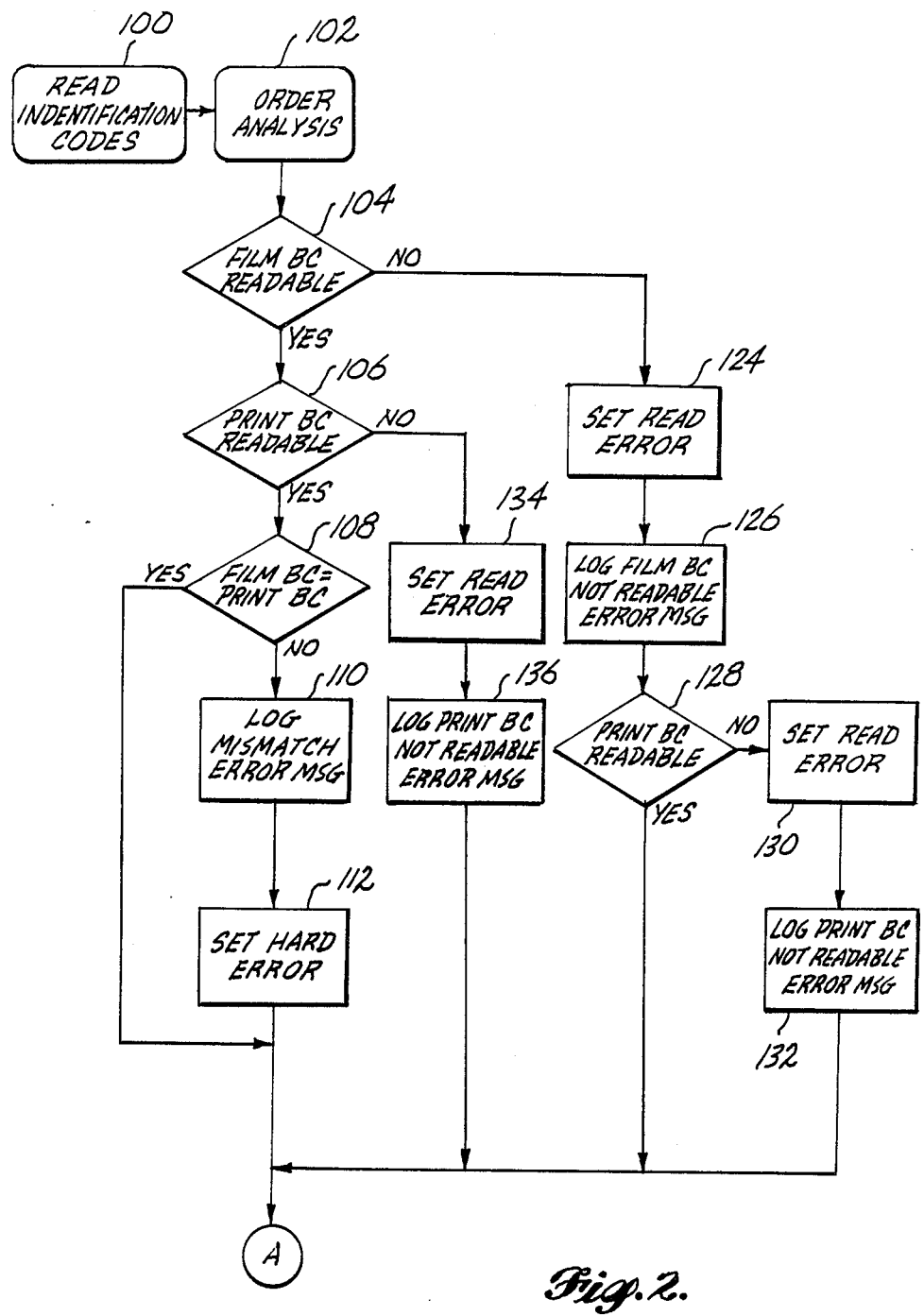
Figure 3:
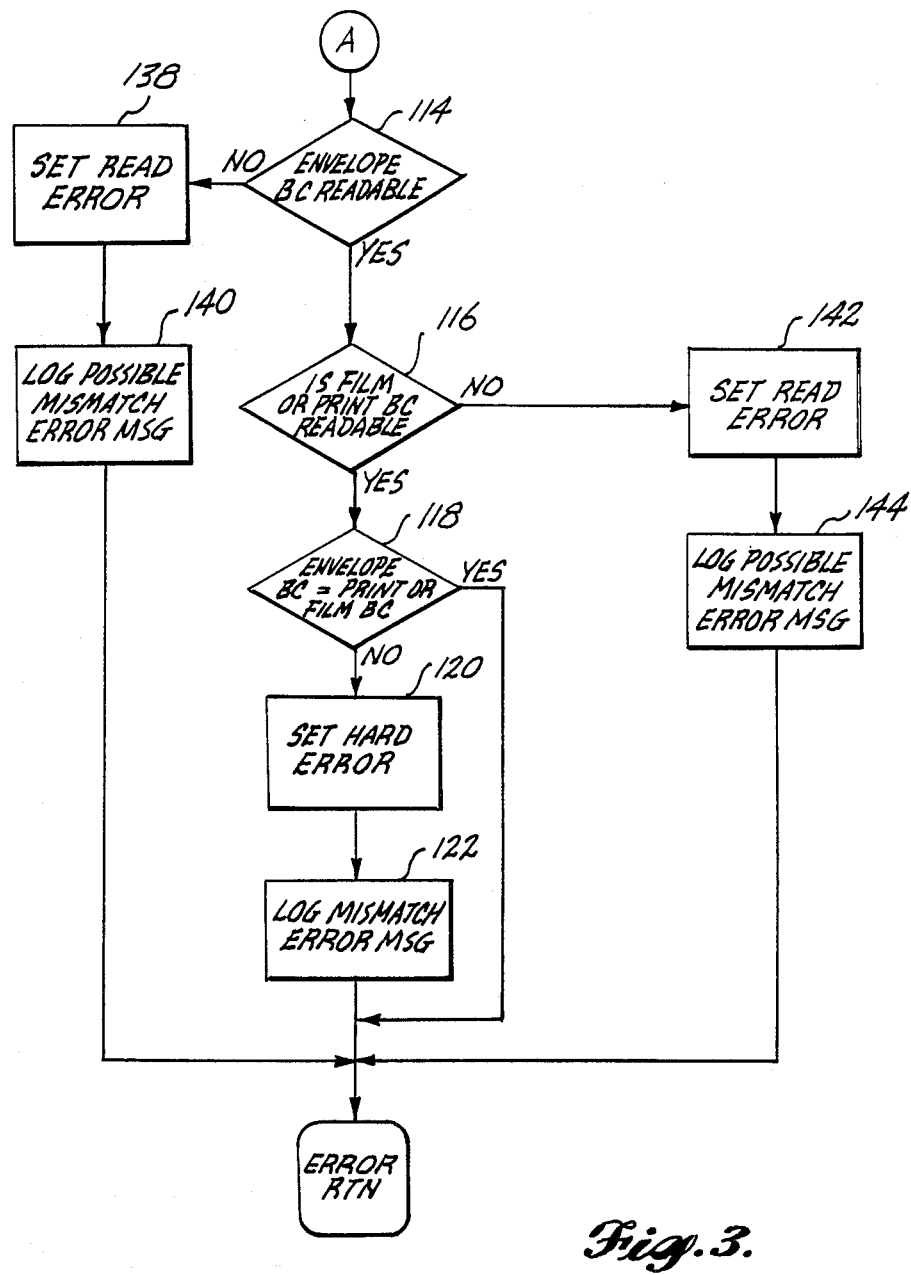

In FIG. 1, the stages of a film processing operation in the commercial photofinishing laboratory are represented. Incoming photographic orders are handled at an input station 10. In the input station, orders from customers are received in envelopes bearing the name and address of the customer and a designation of the dealer who initially received the order from the customer so that the order can be returned to the appropriate dealer and then to the appropriate customer. The order typically will consist of a roll R of undeveloped photographic film or perhaps a film disk D or film negatives F with instructions to produce photographic prints of certain of the negatives. At the input station the film (F, D or R) is separated from the envelope and the film is then readied for processing while the envelope is started on its path through the film lab to an eventual reunion with the film after processing. The film and the envelope both proceed to an identification station 12 where identification codes of one form or another are provided on the envelope and the film so that the envelope and film can be matched together after processing.

There are various schemes currently available for providing the identifying code. In most cases the envelope will carry an identifying code on it. In some cases the identification station 12 will contain a reader which reads the code from the envelope and then reproduces that code or at least a portion of it on the film. The identifying code can be photographically reproduced directly on an unused portion of the film prior to the film being developed. In the case of film rolls R or strips F the film typically is spliced with other films to form a continuous roll for processing and the identifying code can be placed on a splicing tape that holds the adjacent film strips together. In some situations the splicing tape will contain a preprinted code which is placed on the film. In this case, then, the identification station 12 will include a reader and the code on the splicing tape will be read by the reader and an identical code to that contained on the splicing tape will be printed on the envelope. In the case of film discs D, an identification code number, known as an FID, is provided in machine readable and ordinary script form both on the film itself and on a protective container that accompanies the film. For such discs, the identification station 12 includes an FID reader that reads the FID from the disc or protective container and communicates the information to a printer that prints the number on the envelope.

As an alternative or adjunct to any of the above-described schemes, the identification station can include a number generator that generates sequential identification numbers that are transferred to both the film and envelope. The sequential nature of the generated code number can be advantageous in maintaining an ongoing correlation between film and envelope as they proceed through the film lab. Also, the generated codes can contain other data, such as instructions for processing, that can be used to control the developing and printing processes independently of the identifying significance of the code number.

After the envelope and film are provided with the matching machine-readable identifying codes the film moves to a processing station 14 where the undeveloped film is developed and photographic prints made from the developed film. In the case of reprint orders the negatives obtained from the customer are already developed and it is simply necessary to produce the photographic prints from the already developed negatives in the quantities requested by the customer. Once the photographic prints are produced it is desirable to provide the prints with a matching identifying code to the one already present on the film and the envelope to provide a potential three-way matching of print, film, and envelope prior to return to the customer to further enhance the probability that the correct order will reach the customer.

Once the prints are marked with the identifying code all three portions of the order are brought together again at an order finishing station 16 where the three elements are joined before return to the dealer and ultimately to the customer. In the order finishing station the identifying codes on the prints, film, and envelope are read and checked for proper match prior to assembly of the order for pricing and return.

Through the use of machine-readable codes and automatic readers it is possible to read the code on every order that is handled by the order finishing station prior to final assembly of the order. By reading the code from every order any mismatch in identification numbers will be discovered so that corrective action can be taken to prevent a mistake in assembly of the final order. It has been found in actual practice that the more common occurrence is to have a non-read of one of the identification codes rather than a mismatch. Clearly, a mismatch is a condition that cannot be tolerated without intervention to take corrective action. However, in most situations because of the sequential, batch way that the film, envelopes, and prints are handled in the processing lab, actual mismatches are rare. Therefore, most of the time if a misread or non-read occurs and the operation shut down for the order to be checked by hand, it is found that the order parts actually match with one another and if the numbers had been correctly read there would have been no alarm condition. Since each stoppage of production to check the orders, based on a non-read alarm, severely hinders the efficiency of the operation, the present invention contemplates using the empirically developed principal that actual mismatch errors are very rare to conditionally analyze the occurrence of non-reads and provide a "soft alarm" which merely makes note of the non-read condition rather than a "hard error" which treats each non-read or misread as a reason for a production stoppage.

In the preferred embodiment the monitoring of the identification code data and the analysis of the data to determine whether a soft or hard alarm should be set is accomplished by a suitably programmed digital computer operating under program control. FIGS. 2 through 5 provide a simplified flow chart illustrating the operation of the error analysis method under program control. The method of error analysis of the present invention can be used for any number of items bearing an identification code. However, the illustrated flow chart represents use of the method in an analysis of a set of three items corresponding to the film, prints, and envelope of the typical photofinishing order. In step 100 the identification codes of the film, print, and envelope are read at the order finishing station 16. In step 102 the order analysis begins. In step 104 a check is made as to the readability of the film identification code which will typically be a bar coded number. If the film bar code is readable then the program moves to step 106 to determine if the print bar code is readable. If the print bar code is also readable then the program moves to step 108 where the film bar code and the print bar code are compared to see if they are identical to one another indicating a correct order match. If, in step 108, it is determined that the film and print bar codes do not mach, then the mismatch error message to the operator is initiated in step 110. Once the mismatch error message is logged then the program moves to step 112 and sets a hard error flag. In step 114 the program checks the readability of the envelope bar code. If the envelope bar code is readable then it moves to step 116 where a check is made as to whether the film or print bar code is readable and, if either of the film or print bar codes is readable, then they are compared with the envelope bar code to determine if there is a match. If the envelope bar code does not match either the print or the film bar code, a hard error flag is set in step 120 and the mismatch error message is logged, the program then enters into the error routine which will be discussed later.

Going back to step 104, if the film bar code is not readable, the program moves to step 124 and sets a read error flag. The program then logs an error message that the film bar code is not readable and moves on to check the readability of the print bar code. If the print bar code is not readable the program moves to step 130, sets a read error, and logs an error message that the print bar code is not readable in step 132. The program then continues to step 114 and goes through the envelope bar code check described previously. If, at step 104, the film bar code is found to be readable so that the program moves to step 106 and the print bar code is found to be not readable, the program then moves to step 134, sets a read error, and logs an error message that the print bar code is not readable at step 136. The program then goes to step 114 and checks envelope readability as described earlier.

In the decision block of step 108 in the case in which the film bar code and print bar code are both readable and both match, the program immediately moves to step 114 bypassing steps 110 and 112 since there is no need to set a hard error in the match condition. If, at step 114, the program finds the envelope bar code to be unreadable, the program executes step 138 which sets a read error and logs a possible mismatch error message at step 140 prior to entering the error routine. If the envelope bar code is found to be readable in step 114 the program enters step 115 to check the readability of the film or print bar code. If neither the print nor the disk bar code are readable, the program then sets a read error at step 142 and logs a possible mismatch error message at step 144 prior to entering the error routine.

Figure 4:
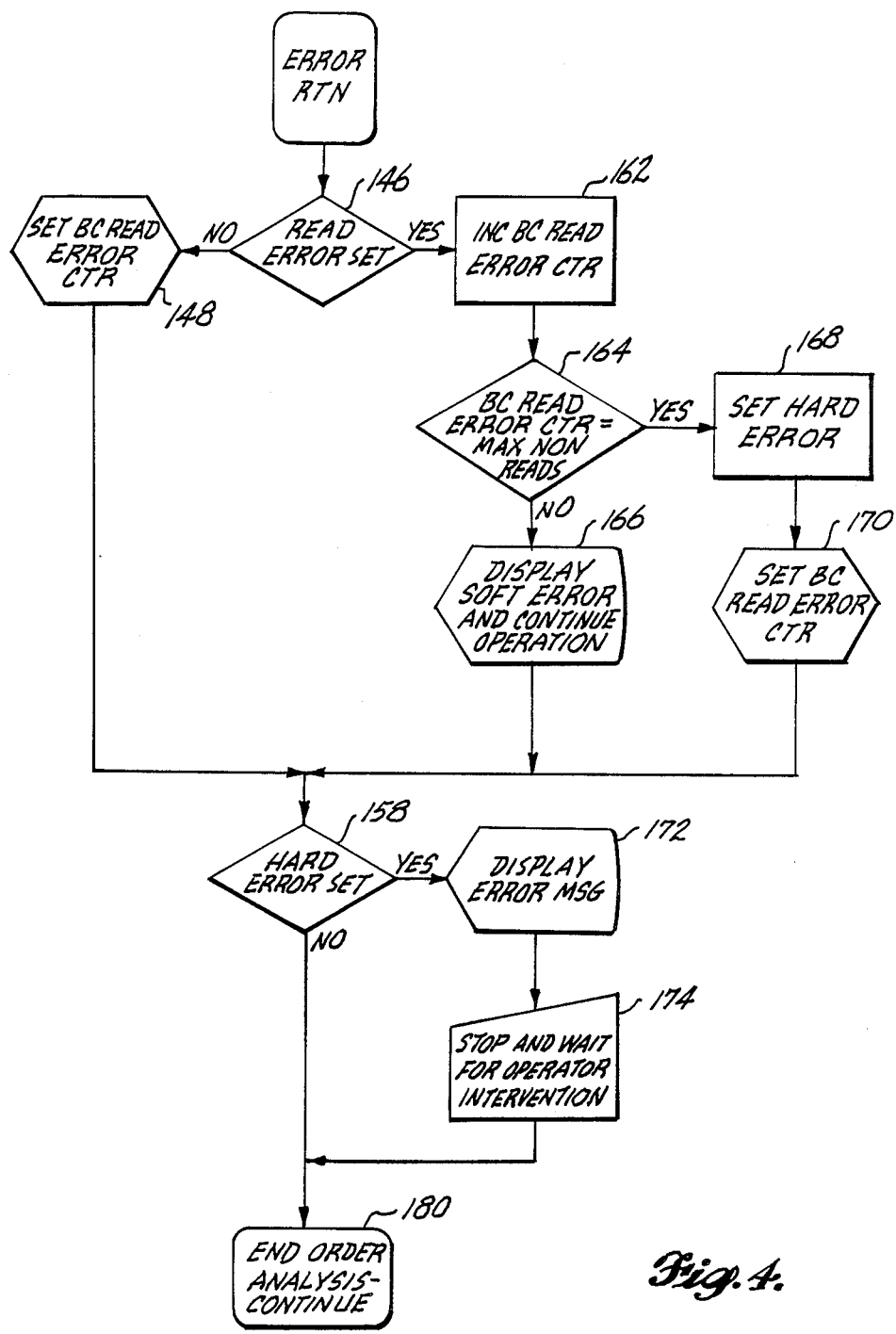

The error routine flow chart is illustrated in FIG. 4 and begins at step 146 with a check to see whether or not a read error has been set. If no read error has been set, that is an indication that the bar codes of the film print and envelope were all readable. In the case where no misreads were found, the program moves directly to the set bar code read error counter routine at step 148. The set bar code read error counter sub-routine is illustrated in the flow chart of FIG. 5. Upon entry into the sub-routine at 148 a check is made as to whether or not this is to be a complete reset. The option of a complete or partial reset is determined by the operator and is set into the program upon initialization. If, at step 150, it is determined that the complete reset mode is desired, the program moves to step 152 to set the error counter to zero and then moves to step 156 for a return to the error routine. If a complete reset is not desired then the program moves to step 154 and the error counter is decremented by some predetermined number which is also set by the operator upon initialization of the program. The set bar code read error counter subroutine is entered in two circumstances. The first is the previously mentioned one in which no read errors have been set after the film, print, and envelope bar codes have been read. The other is in the situation in which the number of read errors indicated by the contents of the read error counter exceeds a maximum allowable number of errors as set into the program upon initialization. If no read errors have been set, then the read error counter is decremented to take into account the successful read history of the last order so that over a span of time one occasional read error from time to time will not accumulate into a situation where a stoppage is indicated because the maximum number of read errors is logged not because of any malfunction in the system but simply because occasional read errors have occurred over a relatively long period of time. A succession of valid reads in between an occasional read error will cancel out the occasional read error and keep the system running. The read error counter is reset or decremented after the maximum number of read errors is reached because at that time the hard error is set and the operation will stop until presumably some corrective action is taken. After the corrective action is taken, the reset of the error counter allows a new error history to be built up. Reliance on the old error history is meaningless after the corrective action. After the completion of the set bar code read error counter sub-routine the program moves back to the error routine and checks at step 158 to see whether a hard error has been set. If no hard error is set, the program reaches the end of the order analysis at step 160 and returns to step 100 to read the next set of identification codes from the next set of film, print, and envelope order portions.

If, at step 146, the program determines that a read error has been set, then the read error counter is incremented at step 162. A check is then made to see whether the read error counter contains a number equal to the maximum number of nonreads allowed in the system as determined by the operator. If the maximum number of nonreads has not yet been reached the program continues to step 166, displays a soft error message to indicate that there has been a read error somewhere in the system, and continues operation. If the maximum number of nonreads has been reached then the program moves to step 168, sets a hard error condition, and then enters the set bar code read error counter sub-routine at step 170. The sub-routine has been described above. After returning from the set bar code read error counter sub-routine at step 158 the routine checks for hard errors and, if a hard error is not set, the order analysis is completed and the program moves on to the next order. If a hard error has been set indicating a mismatch, an error message is displayed at step 172 and the program halts processing and waits for operator intervention to determine the source of the hard error.

It can be seen that the error analysis method disclosed herein can be used with any number of items and not just the three that are dealt with in the illustrated flow charts. By adding steps to check a greater number of identifying codes the program can be modified to handle four or five or even more items. Conversely, the program can also be modified to only check the match between two items and the illustrated flow chart is meant to be exemplary only, not to limit the scope of the method. The maximum number of read errors allowable is a variable that is set by the lab operator based on the operator's determination of the trustworthiness of the order handling sequence. For example, to simulate the present condition where every misread or nonread is treated as a serious error condition requiring stoppage of the processing line, the maximum read error count could be set to one. On the other hand, if, from experience, it has been determined that in very nearly all the cases of a misread the order parts still match, the maximum error number can be set very high so that only upon many misreads will the process be stopped.

While the error analysis process has been described in relation to a matching of parts of a photographic order to one another it can be useful in other environments as well. In fact it can be useful in other situations within the photographic processing lab itself. For example, in processing film it is desirable to check the film for physical damage. The same error analysis can be used to monitor physical damage to the film in that the detection of a tear in the film every few feet is an indication of a potentially serious problem in the processing equipment while an occasional tear identified in the film every few hundred feet does not indicate as serious a problem and perhaps no real problem at all. Therefore, by setting up an error analysis method according to the present invention the film damage can be monitored and tears logged without shutting down the processing operation unless a certain threshold limit is reached in the number of tears per certain unit of length with credit being given for lengths of film where no damage is found. In view of the modifications that can be made to the method disclosed herein as to the number of items being checked, the precise limits for hard and soft errors, and the credit to be given for periods of error-free operation occuring between detected errors, it should be apparent that the invention should not be limited to the precise embodiment illustrated and described herein. The scope of the invention therefore should be determined solely with reference to the appended claims.

The embodiments of the invention in which a property or privilege is claimed are as follows:

1. The method of checking correlation between all parts of a photofinishing order during processing comprising the steps of:
   (a) providing each part of the order with a machine-readable common identifier,
   (b) reading the identifier from each part,
   (c) determining if each identifier is readable,
   (d) resetting an error flag for each unreadable identifier,
   (e) comparing the number of error flags set with a predetermined number and if the error flags exceed the predetermined number initiating a corrective action, and
   (f) if the error flags do not exceed the predetermined number comparing the identifiers with one another and if all identifiers match continuing the processing, if any one of the identifiers does not match initiating corrective action.

2. The method of claim 1 further including the step of decrementing the error counter by a predetermined number each time all the parts of the order contain reaable identifiers.

3. The method of claim 2 further including the step of displaying an error message each time one of the identifiers is determined to be unreadable.

4. The method of claim 3 further including the step of resetting the error counter to zero each time the maximum number of errors is reached.

5. The method of analyzing errors in a process including the steps of:
   (a) detecting a first type of error,
   (b) incrementing an error counter for each detected first type error,
   (c) interrupting the process when the error counter reaches a first predetermined number,
   (d) decrementing the error counter by a second predetermined number for each successful completion of the process occurring between detected first type errors, and
   (e) detecting errors of a second type and interrupting the process upon occurrence of a single error of the second type.

6. The method of claim 5, wherein the error counter is reset to zero upon each successful completion of the process between detected first type errors.

7. A film processing apparatus including:
   means for providing a machine-readable identification on a film, envelope and photographic prints,
   means for reading said machine-readable identifiers from said film, envelope and prints;
   means for sensing a non-read of any one of said identifiers and producing an error signal representative of said non-read;
   error counter means for receiving said error signal and incrementing a number in said counter upon receipt of said error signal;
   first comparator means for comparing the contents of said error counter to a first predetermined number and producing an alarm signal if said contents equals or exceeds said first predetermined number;
   second comparator means for comparing the identifiers and producing an alarm signal if any one of the identifiers is not the same as the other identifiers.

8. The apparatus of claim 7, further including:
decrementing means associated with said error counter and operable to decrement the number in said error counter by a second predetermined number each time said identifiers are all readable.

* * * * *